US008010712B2

(12) United States Patent
Asahara

(10) Patent No.: US 8,010,712 B2
(45) Date of Patent: Aug. 30, 2011

(54) MACRO TRANSMISSION SERVER APPARATUS AND CONTROL METHOD THEREFOR

(75) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 12/338,805

(22) Filed: Dec. 18, 2008

(65) Prior Publication Data

US 2009/0164671 A1    Jun. 25, 2009

(30) Foreign Application Priority Data

Dec. 20, 2007    (JP) ................. 2007-328714

(51) Int. Cl.
G06F 3/00    (2006.01)
(52) U.S. Cl. ................ 710/8; 710/15; 710/17; 709/220; 709/223; 717/168; 717/171
(58) Field of Classification Search .................. None
See application file for complete search history.

(56) References Cited

U.S. PATENT DOCUMENTS

| | | | |
|---|---|---|---|
| 2006/0031238 A1 | 2/2006 | Baba | |
| 2006/0031816 A1 | 2/2006 | Umeda | |
| 2006/0044580 A1 | 3/2006 | Maeda | |
| 2006/0044587 A1 | 3/2006 | Yoshida | |
| 2006/0187483 A1 | 8/2006 | Baba | |
| 2007/0006216 A1* | 1/2007 | Nakane et al. ............ | 717/173 |
| 2007/0013943 A1* | 1/2007 | Sawayanagi et al. ...... | 358/1.15 |

FOREIGN PATENT DOCUMENTS

| | | |
|---|---|---|
| EP | 1837818 A1 | 9/2007 |
| JP | 05-246111 A | 9/1993 |
| JP | 08-329338 A | 12/1996 |
| JP | 10-063511 A | 3/1998 |
| JP | 2006-260544 A | 9/2006 |

OTHER PUBLICATIONS

Anonymous; "Mfp control panel web interface with macro record and play"; Research Disclosure; Jan. 7, 2004; two pages, vol. 483, No. 115, XP007134101; Mason Publications, Hampshire, G.B.

* cited by examiner

*Primary Examiner* — Eron J Sorrell
(74) *Attorney, Agent, or Firm* — Canon U.S.A. Inc., I.P. Division

(57) ABSTRACT

A macro transmission server apparatus stores a combination of functions of a multifunction peripheral and an order of processing of the functions as a macro. The macro transmission server apparatus manages a plurality of such macros and determines a portion of the plurality of such macros to be transmitted to a multifunction peripheral on a network as a transmission set. The macro transmission server apparatus includes a change detection unit configured to detect a change in function of the multifunction peripheral, a transmission set updating unit configured to change the transmission set according to the change detected by the change detection unit such that at least one of the macros that is executable by the multifunction peripheral is included in the transmission set, a macro storage unit configured to store the transmission set and the plurality of such macros, and a macro transmission unit configured to transmit the transmission set to the multifunction peripheral.

11 Claims, 8 Drawing Sheets

```
<?xml version="1.0"encoding="UTF-8"?>
<macro id="00000000-1111-2222-3333-444444444444">
  <E-MAIL>
    <E-MAIL ADDRESS>someone@somewhere.com</E-MAIL ADDRESS>
    <TimeStamp>ON</TimeStamp>
  </E-MAIL>
</macro>
```

MACRO FOR TRANSMITTING E-MAIL

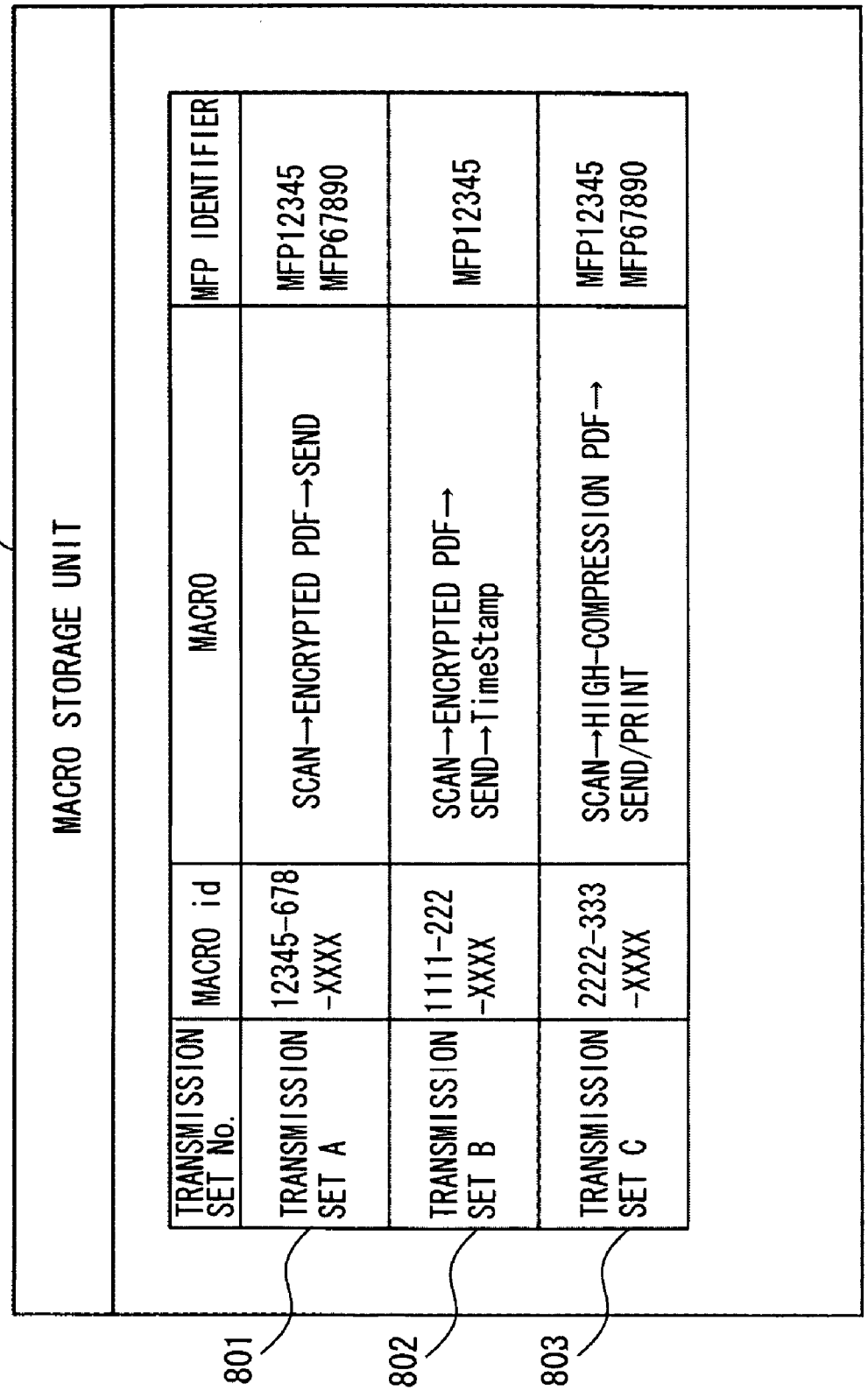

MACRO TRANSMISSION SERVER APPARATUS AND CONTROL METHOD THEREFOR

BACKGROUND OF THE INVENTION

1. Field of the Invention

The present invention relates to a macro transmission server apparatus and a control method therefor. In particular, the present invention relates to a macro transmission server apparatus configured to store a macro which is a setting value related to a job to be performed by an image processing apparatus. The macro transmission server apparatus transmits a macro to an image processing apparatus that includes a function for retrieving and executing a macro according to a user instruction.

2. Description of the Related Art

Recent multifunction peripherals (MFPs) include a printer function, a facsimile transmitting and receiving function, and an e-mail transmitting and receiving function in addition to a copy function. Such MFPs have improved business efficiency.

However, the number of items that a user is required to set on an operation unit of the MFP has increased along with an increase in the number of functions provided by the MFP. In response to such problem, there is a macro function that records operations performed by a user and assigns the recorded content to one operation key. Consequently, such a macro function has improved the operability of an MFP. To be more specific, a macro is script data that defines a combination of functions that can be performed by an MFP and an order of processing such functions.

Examples of apparatuses including a macro function include a printing apparatus discussed in Japanese Patent Application Laid-Open No. 05-246111 and a cash register apparatus discussed in Japanese Patent Application Laid-Open No. 08-329338.

Japanese Patent Application Laid-Open No. 05-246111 discusses a method of registering types of operation keys that a user serially presses and an order in which the user presses the keys as an operating procedure (i.e., a macro). The operating procedure is registered using key codes that are generated when the user presses the operation keys. Then, the operating procedure can be executed when a call key corresponding to the operating procedure is pressed by the user.

Further, Japanese Patent Application Laid-Open No. 08-329338 discusses a method of registering an execution process of an operation as a macro (i.e., an operating procedure) while causing the apparatus to actually execute the operation. As a result, a macro registration error can be prevented.

Further, a technology is being developed for office use in which an administrator, such as an information technology (IT) manager, can concurrently transmit a macro of a routine task to a plurality of managed MFPs from a server apparatus.

In the above-described transmission, a plurality of macros is transmitted as a set. To be more specific, a plurality of macros that corresponds to a plurality of different routine tasks is transmitted to an MFP. Such a plurality of macros is also referred to as a macro group.

A macro function can reduce operating cost in a case where a macro function is applied to an MFP. However, not all of the macros that are created can be commonly used by all MFPs.

For example, a macro that creates an encrypted Portable Document Format (PDF) file cannot be executed unless there is a license for using encrypted PDF.

If macro data is transmitted to all MFPs without consideration of the above-described case, a large amount of unusable macros are displayed on a screen. Consequently, a user interface becomes difficult to use, and there is an increase in network traffic.

To solve such problem, Japanese Patent Application Laid-Open No. 10-063511 discusses a job script execution apparatus. More specifically, Japanese Patent Application Laid-Open No. 10-063511 discusses a method of transmitting a software program that compensates for a function which is lacking in an apparatus to the apparatus together with a macro. As a result, the apparatus can execute the macro.

However, there are many cases where a macro cannot become executable by the method discussed in Japanese Patent Application Laid-Open No. 10-063511. For example, if the technique is applied to an MFP, a macro may not be executable when the MFP is to use a hardware option such as a finisher option, a software option in which a license is necessary for using the software, or a function that requires an environmental setting.

Consequently, at present, a product is being proposed in which an administrator stores a macro that is to be transmitted to an MFP of a specific group as a transmission set. The administrator manually performs maintenance on the transmission set, so that the appropriate macro is always transmitted to an MFP.

However, the above-described method increases management cost of the administrator. For example, it is burdensome for an administrator to create a transmission set at an initial installment, or to make a revision to create an appropriate set every time there is a change in a device configuration or in a macro.

SUMMARY OF THE INVENTION

The present invention is directed to a macro transmission server apparatus and a macro transmission method capable of reducing management cost.

According to an aspect of the present invention, a macro transmission server apparatus stores a combination of functions of a multifunction peripheral and an order of processing of the functions as a macro. The macro transmission server apparatus manages a plurality of such macros and determines a portion of the plurality of such macros to be transmitted to a multifunction peripheral on a network as a transmission set. The macro transmission server apparatus includes a change detection unit configured to detect a change in function of the multifunction peripheral, a transmission set updating unit configured to change the transmission set according to the change detected by the change detection unit such that at least one of the macros that is executable by the multifunction peripheral is included in the transmission set, a macro storage unit configured to store the transmission set and the plurality of such macros, and a macro transmission unit configured to transmit the transmission set to the multifunction peripheral.

According to another aspect of the present invention, a server apparatus transmits a macro to a plurality of multifunction peripherals that can execute the macro. The server apparatus automatically makes a macro transmission setting even in a case where a function of the multifunction peripheral is changed, and can thus reduce management cost.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a macro according to an exemplary embodiment of the present invention.

FIG. 8 illustrates a configuration of macro transmission sets and macros according to an exemplary embodiment of the present invention.

DETAILED DESCRIPTION OF THE EMBODIMENTS

Various exemplary embodiments, features, and aspects of the invention will be described in detail below with reference to the drawings.

Figure 1:
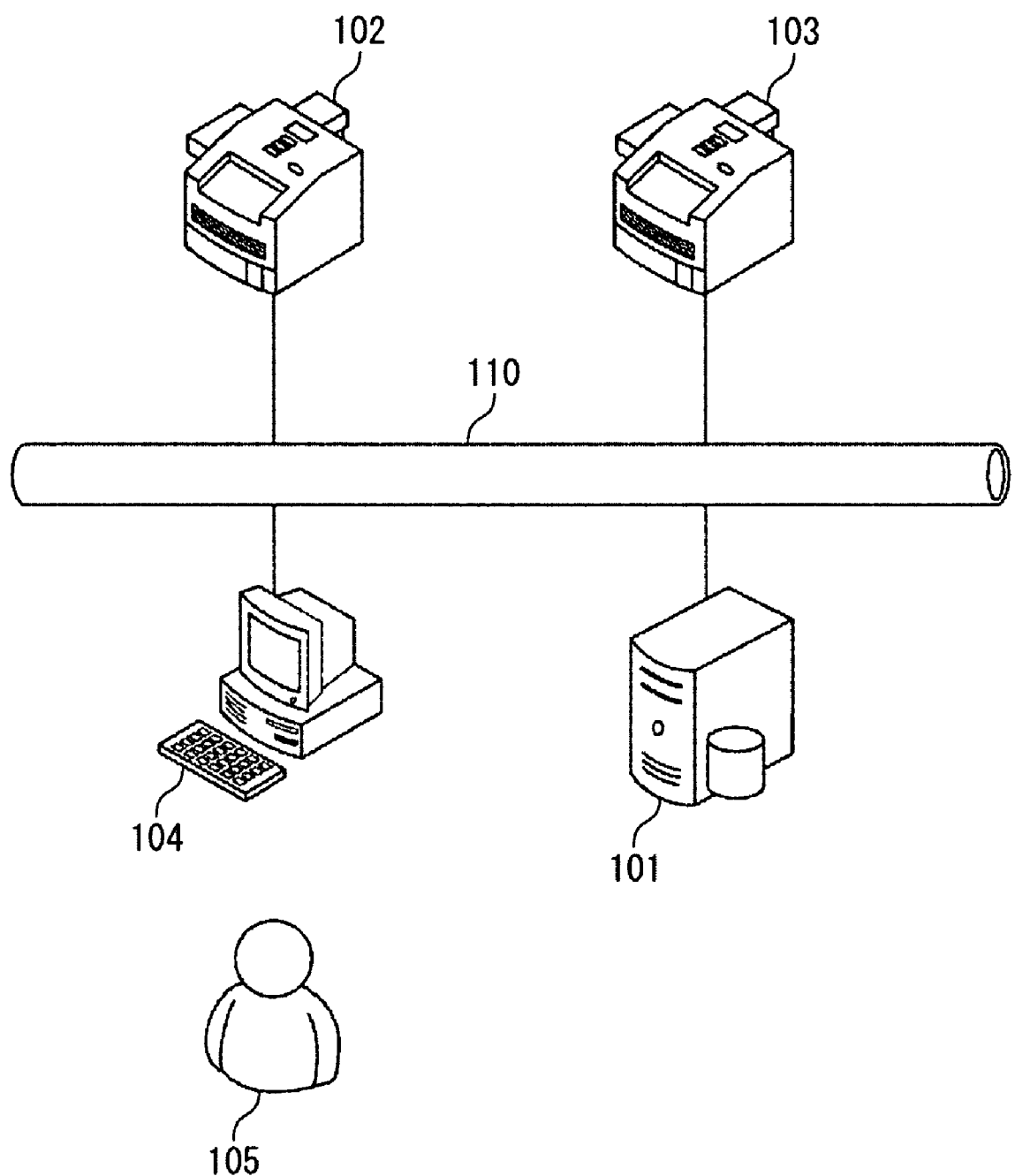
FIG. 1 illustrates a system configuration and a network configuration according to an exemplary embodiment of the present invention.

FIG. 1 illustrates a system configuration and a network configuration according to a first exemplary embodiment of the present invention.

A transmission server 101 is connectable to a local area network (LAN) 110, together with an MFP 102, an MFP 103, and a client machine 104, which can communicate with each other.

The MFP 102 and the MFP 103 can communicate with the transmission server 101 via the LAN 110. The MFP 102 and the MFP 103 each store macro data received from the transmission server 101. The MFP 102 and the MFP 103 each also include macro execution functions for analyzing the macro data and executing a predetermined macro. For ease of description, in the present exemplary embodiment, the transmission server 101 manages two MFPS. However, the transmission server 101 can also manage three or more MFPs.

The client machine 104 can communicate with the transmission server 101 via the LAN 110. An administrator 105 can operate the transmission server 101 via the client machine 104. In the present exemplary embodiment, the administrator 105 makes a setting to the transmission server 101 via the client machine 104. However, the transmission server 101 can include a user interface, so that the administrator 105 can make a setting to the transmission server 101 via the user interface.

Further, in the present exemplary embodiment, the transmission server 101 functions as an independent server. However, the transmission server 101 can be installed in either of the MFPs such as the MFP 102 or the MFP 103. A transmission server apparatus can be included in an MFP in a case where there is a platform on the MFP that executes software such as Java®.

Figure 2:
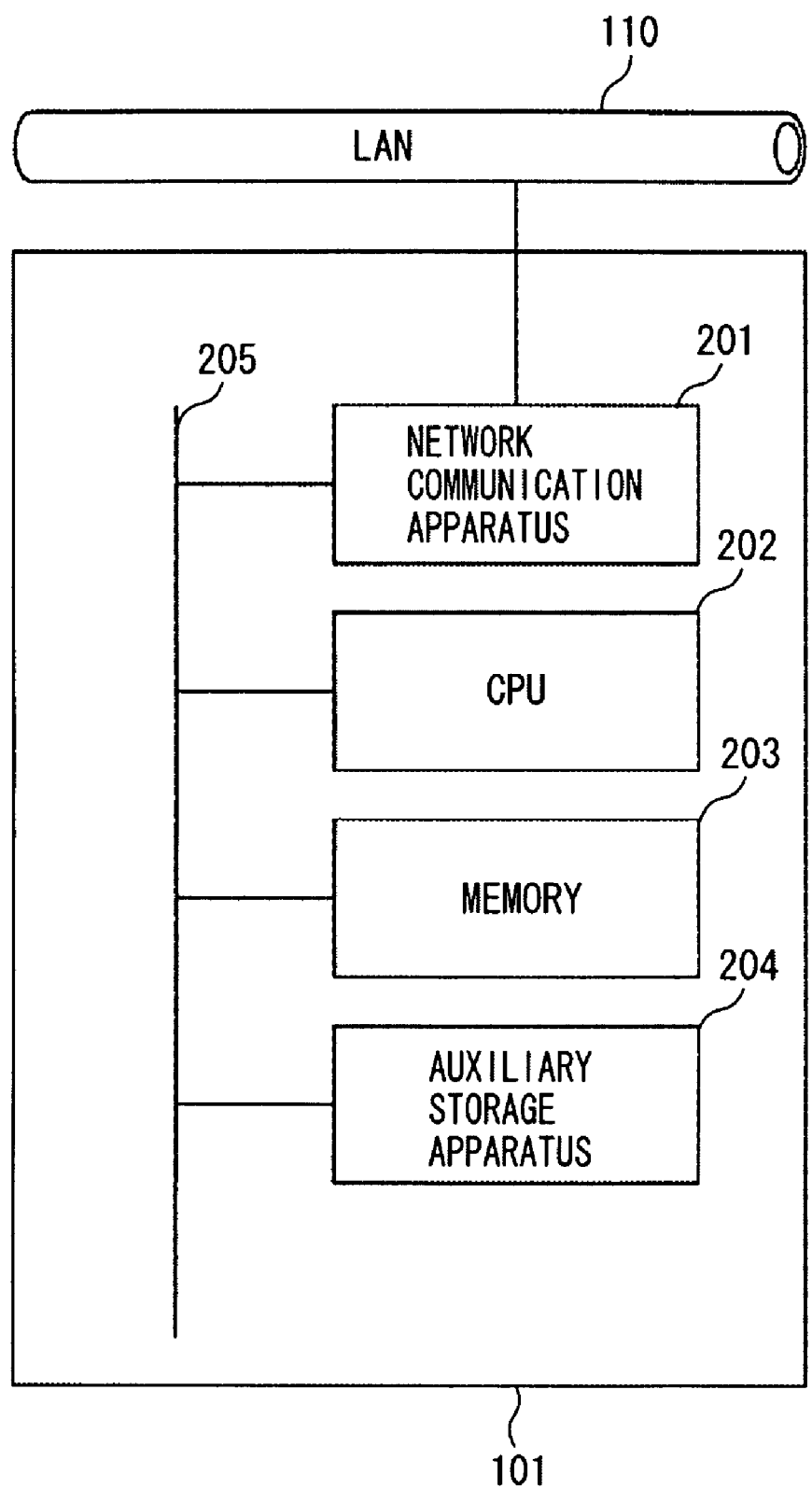
FIG. 2 illustrates a hardware block diagram of a transmission server according to an exemplary embodiment of the present invention.

FIG. 2 illustrates a hardware configuration of the transmission server 101 according to an exemplary embodiment of the present invention.

A network communication apparatus 201 is a module that transmits and receives data between an information apparatus on a network via the LAN 110.

A central processing unit (CPU) 202 executes programs and performs control of various processes.

A memory 203, which is formed by a random access memory (RAM) or a read-only memory (ROM), is used as a storage location for programs and data.

An auxiliary storage apparatus 204, which is configured of a mass-storage apparatus such as a hard disk or a digital versatile disk (DVD)-RAM drive, stores large volumes of data or program execution code. The auxiliary storage apparatus 204 stores data that is required to be stored for a long time, as compared to data stored in the memory 203. In the present exemplary embodiment, the auxiliary storage apparatus 204 stores macro data and a schedule of transmitting such macro data, which are managed by the transmission server 101. The network communication apparatus 201, central processing unit (CPU) 202, memory 203, and auxiliary storage apparatus 204 are interconnected by a bus 205. The hardware configuration of the transmission server 101 can be realized by a general-purpose server computer.

Figure 3:
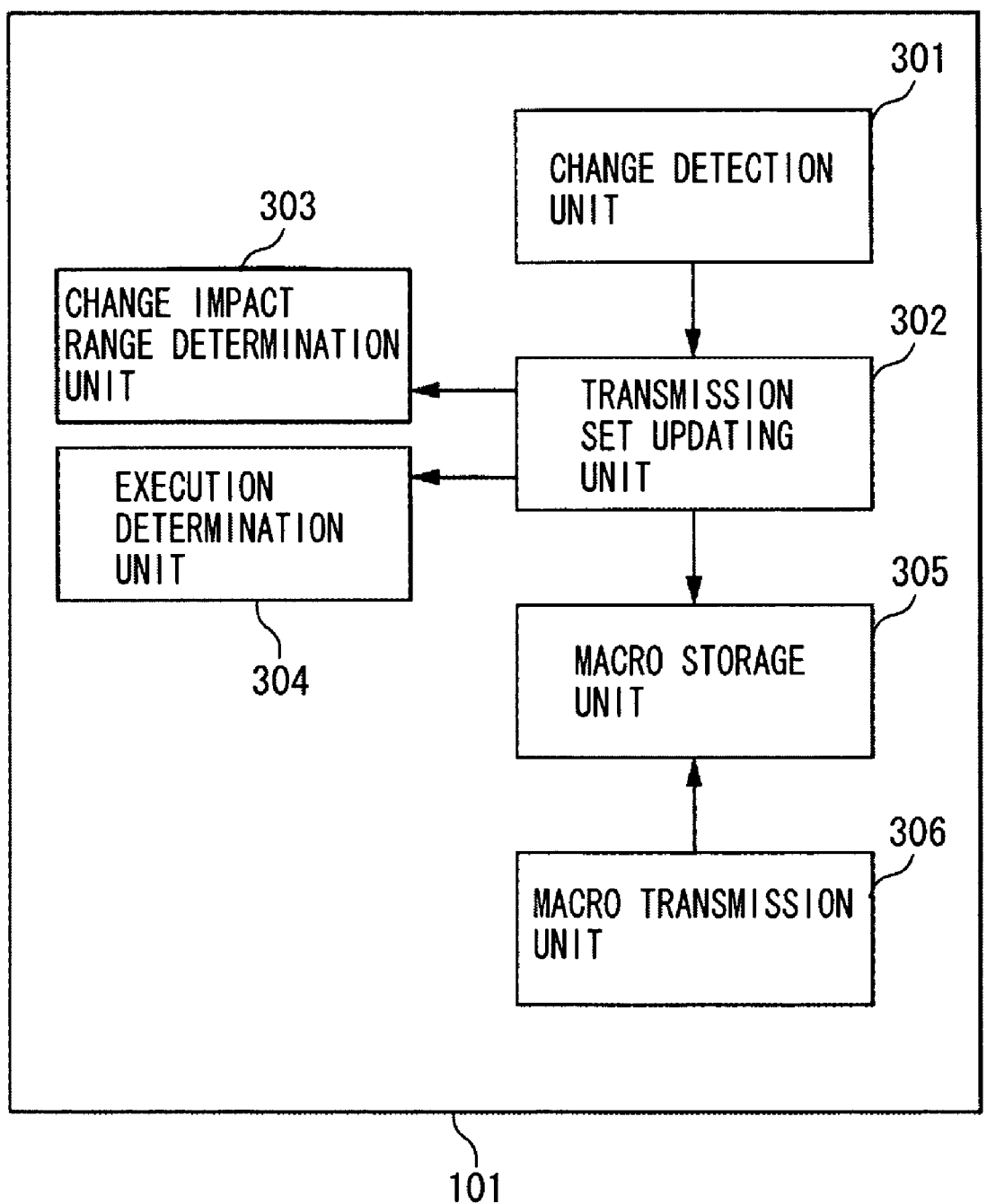
FIG. 3 illustrates a software block diagram of a transmission server according to an exemplary embodiment of the present invention.

FIG. 3 illustrates a software configuration of the transmission server 101. Each software module illustrated in FIG. 3 is executed by the CPU 202 of the transmission server 101.

A change detection unit 301 detects a change in functions supported in an MFP group such as the MFP 102 and MFP 103 connected to a network (LAN 110). The change detection unit 301 regularly makes reference to a unique supporting function list of each MFP via the LAN 110. The change detection unit 301 thus checks whether there is a difference from the previously-referenced supporting function list.

Figure 4:
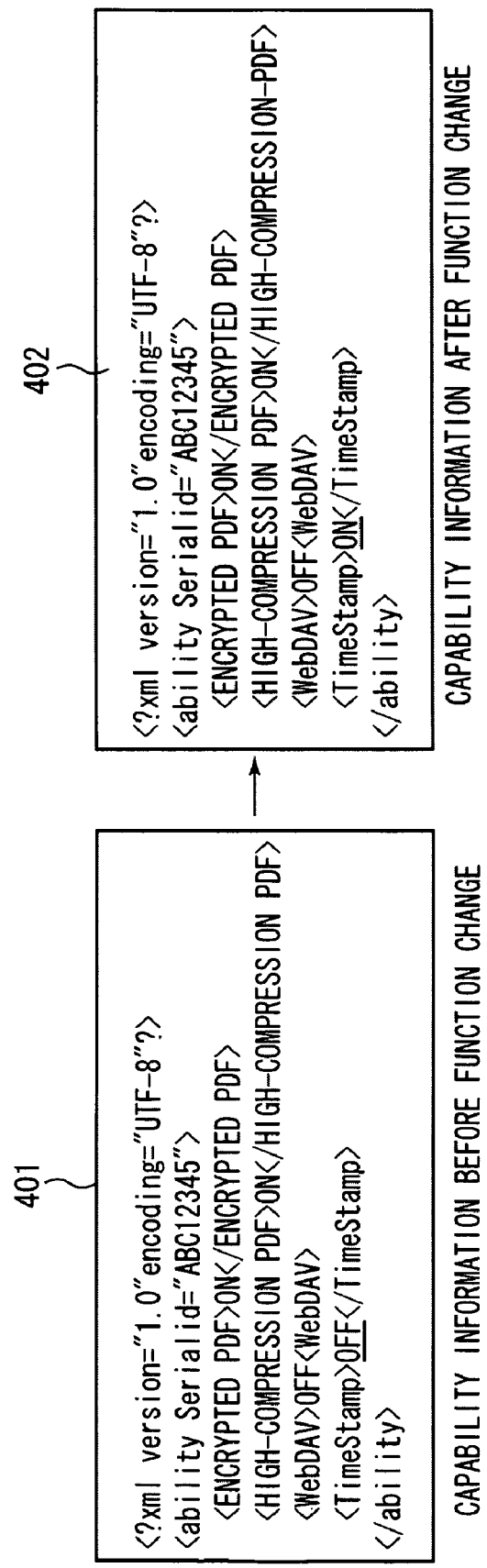
FIG. 4 illustrates an example of a list of capability information of an MFP according to an exemplary embodiment of the present invention.

FIG. 4 illustrates an example of a supporting function list. Capability information before function change 401 is a list of supporting functions before there is a change in functions supported in an MFP. Capability information after function change 402 is a list of supporting functions after there is a change in functions supported in the MFP. The supporting function list, which is unique function information about each MFP, is stored in each MFP as a file in Extensible Markup Language (XML) format. The change detection unit 301 can confirm functions supported in the MFP by exchanging the XML file with the MFP via a predetermined web service. In the example illustrated in FIG. 4, a TimeStamp tag in the Capability information after function change 402 indicates that a time stamp function has become additionally supported in the MFP.

Referring to FIG. 3, a transmission set updating unit 302 updates a transmission set stored in a macro storage unit 305 according to a change in supporting functions detected by the change detection unit 301. To be more specific, a change impact range determination unit 303 and an execution determination unit 304 determine a content to be updated in the transmission set as described below.

The change impact range determination unit 303 receives information about a device (MFP) in which there is a change and a content of the change from the change detection unit 301. The change impact range determination unit 303 then determines a range of impact of the change. In other words, the change impact range determination unit 303 determines the range of change. In the present exemplary embodiment, a change indicates an addition or a deletion of a function. Further, the change impact range determination unit 303 receives, from the macro storage unit 305, a full set of information about a device (MFP) and information about a transmission set transmitted to a device (MFP) in which there is a change.

If the change is an addition of a function, the change impact range determination unit 303 determines a difference between a full set of information about the device (MFP) and a transmission set to be transmitted to the device (MFP) in which there is a change as the range of impact of the change. The full set of information and the transmission set are stored in the macro storage unit 305. On the other hand, if the change is a deletion of a function, the change impact range determination unit 303 determines a transmission set to be transmitted to a device (MFP) in which there is a change as the range of impact of the change. The transmission set is stored in the macro storage unit 305.

The execution determination unit 304 receives information about supporting functions of a device (MFP) in which there is a change and a content of the change from the change detection unit 301. Further, the execution determination unit 304 receives information about a range of impact of change determined by the change impact range determination unit 303. Further, the execution determination unit 304 receives, from the macro storage unit 305, information about a transmission set to be transmitted to a device (MFP) in which there is a change.

The execution determination unit 304 then determines, according to the content of the change to the supporting functions, whether a macro included in the range of impact of change is to be added to or deleted from the transmission set. The macro included in the range of impact of change is then added to or deleted from macros in the transmission set. The determination is made based on the above-described information.

The execution determination unit 304 makes the above-described determination by checking whether functions necessary for executing a macro are included in the supporting functions of the device (MFP). If even one supporting function is missing, the execution determination unit 304 determines that the macro cannot be executed.

The macro storage unit 305 stores information about a macro.

FIG. 5 illustrates an example of a macro according to an exemplary embodiment of the present invention. A macro 501 illustrated in FIG. 5 for transmitting an e-mail includes information about an e-mail transmission destination. The macro 501 also indicates that a time stamp (TimeStamp) is to be used as an option when sending the e-mail.

The administrator 105 registers a full set of macros that the administrator 105 desires to be actually used by an end user. The full set is registered among macros stored in the transmission server 101. In the present exemplary embodiment, a full set of macros is not transmitted to all MFPs on the network, such as the MFP 102 and MFP 103. Instead, a transmission set, which is a group of macros to be transmitted, is set for each MFP.

A transmission set includes a list of identification (ID) numbers of macros and MFP identifiers of the transmission destinations, as indicated in the macro 501 illustrated in FIG. 5. In the macro 501 illustrated in FIG. 5, a macro id tag indicates an ID number of a macro and an MFP identifier. The MFP identifier is a unique identifier for identifying an MFP which uses a device serial number. For example, in FIG. 5, the ID number of the macro is indicated by 00000000-1111-2222-3333, and the MFP identifier is indicated by 444444444444. Alternatively, a format can be employed in which the MFP identifier is indicated by 00000000, and the ID number of the macro is indicated by 1111-2222-3333-444444444444 in FIG. 5. If it is the description that the ID number of a macro and the MFP identifier are associated with a transmission set as is indicated in the above example, it goes without saying that the format is not limited to the above example.

Referring back to FIG. 3, a macro transmission unit 306 transmits a transmission set to a target MFP. A scheduler which manages timing of transmission is maintained by the administrator 105.

Figure 6:
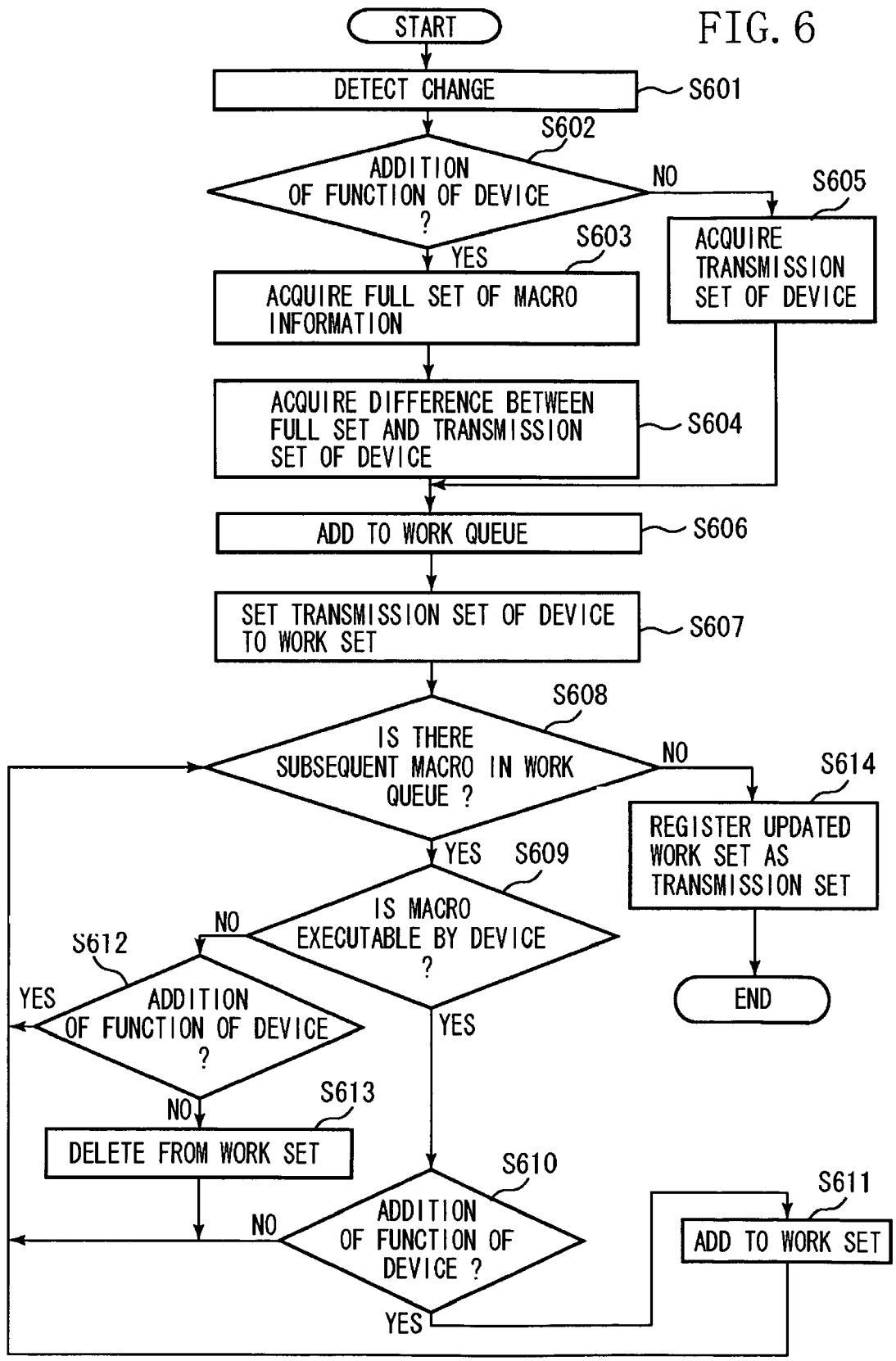
FIG. 6 illustrates a flowchart according to an exemplary embodiment of the present invention.

FIG. 6 is a flowchart illustrating a process according to the present exemplary embodiment.

In step S601, the CPU 202 detects a change in supporting functions of an MFP group including the MFP 102 and MFP 103 connected to a network. The CPU 202 detects the change via the change detection unit 301.

In step S602, the CPU 202 determines whether the function change information detected by the change detection unit 301 is an addition of a function or a deletion of a function. If the change is an addition of a function (YES in step S602), the process proceeds to step S603. On the other hand, if the change is a deletion of a function (NO in step S602), the process proceeds to step S605.

In step S603, the CPU 202 acquires a full set of macro information from the macro storage unit 305.

In step S604, the CPU 202 acquires a transmission set from the macro storage unit 305 and then acquires a difference between the acquired full set of macro information and the acquired transmission set.

In step S605, the CPU 202 acquires a transmission set from the macro storage unit 305.

In step S606, the CPU 202 adds the set of macros that is acquired as a result of step S604 or step S605 to a work queue.

In step S607, the CPU 202 acquires information about a transmission set from the macro storage unit 305. The CPU 202 then sets the acquired transmission set to a work set as a transmission set to be edited.

In step S608, the CPU 202 determines whether there is a subsequent macro in the work queue. If there is a macro in the work queue (YES in step S608), the process proceeds to step S609. If there is no macro in the work queue (NO in step S608), the process proceeds to step S614.

In step S609, the CPU 202 acquires the subsequent macro from the work queue. The CPU 202 (the execution determination unit 304) then determines whether the acquired macro can be executed by the MFP. If the macro can be executed (YES in step S609), the process proceeds to step S610. On the other hand, if the macro cannot be executed (NO in step S609), the process proceeds to step S612.

In step S610, the CPU 202 determines whether a content of change received from the change detection unit 301 is an addition of a function or a deletion of a function. If the change is an addition of a function (YES in step S610), the process proceeds to step S611. If the change is a deletion of a function (NO in step S610), the process returns to step S608.

In step S611, the CPU 202 adds the acquired macro to the work set, and the process returns to step S608.

In step S612, the CPU 202 determines whether the content of the change received from the change detection unit 301 is an addition of a function or a deletion of a function, similarly as in step S610. If the change is an addition of a function (YES in step S612), the process returns to step S608. On the other hand, if the change is a deletion of a function (NO in step S612), the process proceeds to step S613.

In step S613, the CPU 202 deletes the macro from the work set. Thus, in step S611 or S613, the CPU 202 adds the macro to the work set or deletes the macro from the work set.

In step S614, the CPU 202 registers the updated work set as a new transmission set. If a transmission set is already registered in the scheduler, the transmission set is corrected by replacing the transmission set that is registered in the scheduler with the updated work set. After step S614, the process ends.

Figure 7:
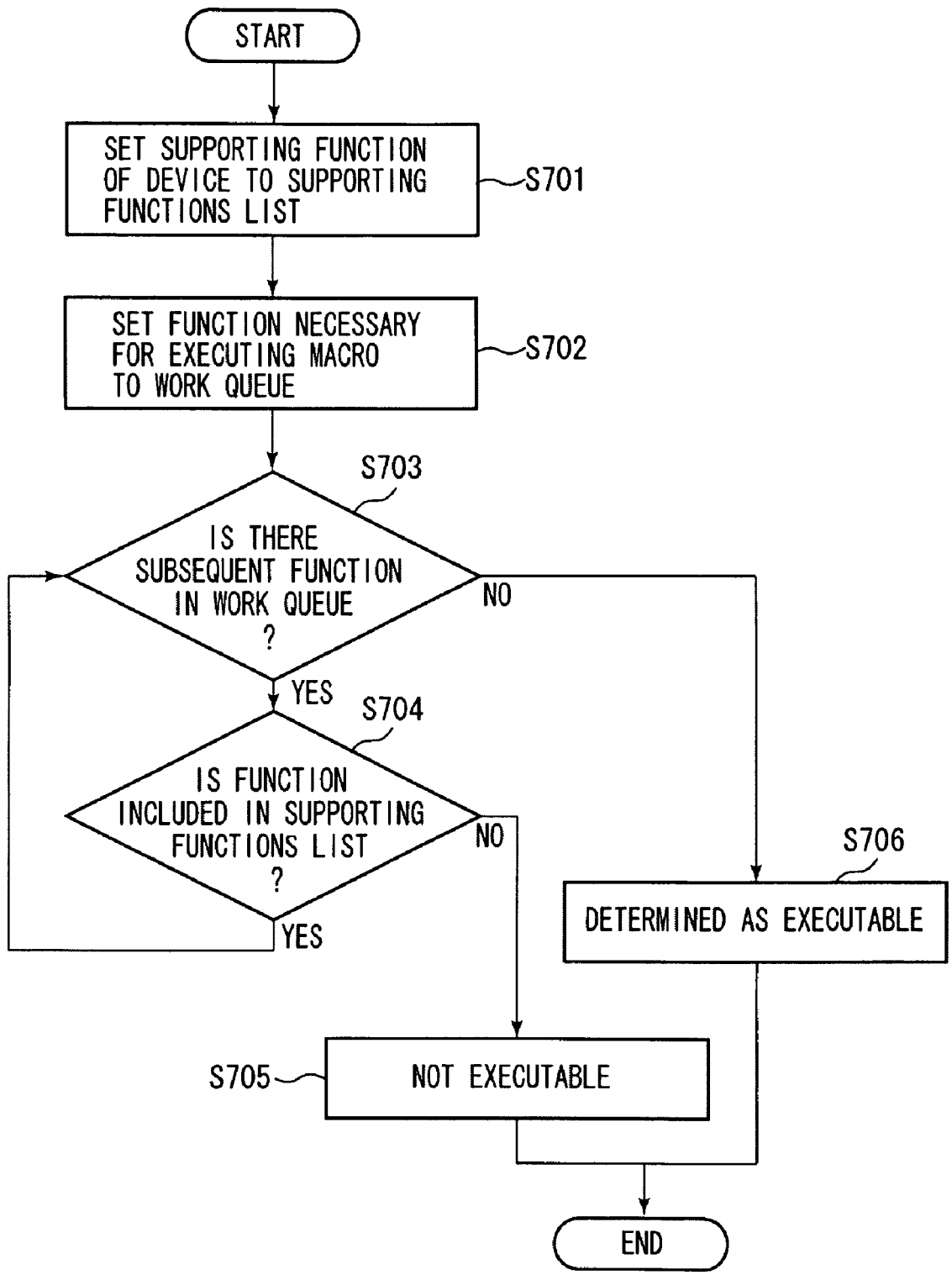
FIG. 7 is a flowchart illustrating a process performed by an execution determination unit according to an exemplary embodiment of the present invention.

FIG. 7 is a flowchart illustrating the method of determination performed by the execution determination unit 304 in step S609 of the flowchart illustrated in FIG. 6 according to the present exemplary embodiment.

In step S701, the CPU 202 sets a function supported in a device, which corresponds to a change in the supporting functions detected by the change detection unit 301, to the supporting function list.

In step S702, the CPU 202 sets a supporting function which is necessary for executing the macro to the work queue.

In step S703, the CPU 202 determines whether there is a subsequent function in the work queue. If there is a subsequent function in the work queue (YES in step S703), the process proceeds to step S704. If there is no subsequent function in the work queue (NO in step S703), the process proceeds to step S706.

In step S704, the CPU 202 retrieves the subsequent function from the work queue. The CPU 202 then determines whether the retrieved function is included in the supporting function list set of step S701. If the function is included in the list (YES in step S704), the process returns to step S703. On the other hand, if the function is not included in the list (NO in step S704), it indicates that the macro cannot be executed. The process then proceeds to step S705.

In step S705, since the CPU 202 has confirmed that the macro cannot be executed in step S704, the CPU 202 determines that the macro cannot be executed. The process then ends.

In step S706, since the CPU 202 has confirmed that all functions for executing the macro are supported as a result of repeating steps S703 and S704, the CPU 202 determines that the macro can be executed. The process then ends.

Referring to the example of a supporting function list illustrated in FIG. 4, encrypted PDF and high-compression PDF functions can be executed by the device (MFP) according to the capability information before function change 401. On the other hand, WebDAV (web-based distributed authoring and visioning) and TimeStamp functions cannot be executed according to the capability information before function change 401. In such a case, the macro is determined to be executable if the macro to be determined in the flowchart illustrated in FIG. 7 includes only encrypted PDF and high-compression PDF functions. Further, the macro is determined not to be executable if the macro to be determined includes the WebDAV or TimeStamp function.

Further, the encrypted PDF, high-compression PDF, and TimeStamp functions are executable by the device according to the capability information after function change 402. However, the WebDAV function is not executable. Therefore, the macro is determined to be executable in the flowchart illustrated in FIG. 7 if the macro includes only the encrypted PDF, high-compression PDF, and TimeStamp functions. On the other hand, the macro is determined to be not executable if the macro includes the WebDAV function.

FIG. 8 illustrates an example of a configuration of macro transmission sets and macros according to the present exemplary embodiment. To be more specific, FIG. 8 illustrates a schematic view of macro transmission sets and each of the macros stored in the macro storage unit 305 of the transmission server 101.

The example of FIG. 8 illustrates only three types of macros for ease of description, although more or fewer types of macros can alternatively be used in accordance with the present invention. The combination of three transmission sets A 801, B 802, and C 803 corresponds to a full transmission set of macros in this example.

Referring to the table illustrated in FIG. 8, a transmission set is associated with a macro id, a macro, and an MFP identifier of the transmission destination MFP. Unlike the example illustrated in FIG. 5, each macro illustrated in FIG. 8 is not described in XML. Instead, each macro illustrated in FIG. 8 includes functions and an order of processing indicated by a specific content of the macro.

For example, in the transmission set A 801, a macro id is 12345-678-xxxx, and a macro that executes "scan→encrypted PDF→send" is associates with the macro id. Further, MFP12345 and MFP67890 are registered as MFP identifiers that indicate transmission destination MFPs.

The supporting function list of the MFP illustrated in FIG. 4 is then applied to the table illustrated in FIG. 8. It is supposed that "scan", "print", and "send" are basic functions of the MFP that can be executed by any MFP. Further, the WebDAV function illustrated in FIG. 4 will be omitted in the table illustrated in FIG. 8.

Further, the MFP MFP67890 illustrated in FIG. 8 corresponds to the MFP that includes the supporting function list illustrated in FIG. 4.

According to the capability information before function change 401 illustrated in FIG. 4, the device (MFP) can execute the encrypted PDF and high-compression PDF functions. However, the device (MFP) cannot execute the TimeStamp function.

Therefore, a combination of the transmission set A 801 and the transmission set C 803, acquired by removing the transmission set B 802 from the full set, becomes the transmission set to be sent to the MFP MFP67890.

A function change is then detected in the MFP MFP67890, so that the capability information is changed to the capability information after function change 402. Since the MFP MFP67890 can execute the encrypted PDF, high-compression PDF, and TimeStamp functions after the function change, "MFP67890" is added to the MFP identifier associated with the transmission set B 802.

As a result, the full set including the transmission sets A 801, B 802, and C 803 is transmitted to the MFP MFP67890 after the function change.

In the first exemplary embodiment, the supporting function list illustrated in FIG. 4, to which the change detection unit 301 makes reference, is a file in XML format stored in each MFP. However, the supporting function list can be configured in a different manner.

For example, the supporting function list can be a general text file, such as a comma separated value (CSV) file. Further, the supporting function list can be a binary file created by a predetermined method. Further, it is not necessary for the supporting function list to be a file, and the transmission server 101 can directly receive data from each MFP instead.

Further, in the first exemplary embodiment, the encrypted PDF, high-compression PDF, TimeStamp, and WebDAV functions are included in the supporting function list. However, other functions can be included. For example, the list can include plug-in applications, or functions that are provided by hardware options, e.g., a facsimile or a finisher.

Further, in the first exemplary embodiment, the transmission server 101 receives files that indicate both functions supported in the MFP and functions not supported in the MFP from each MFP. However, the transmission server 101 can also receive only the functions supported in the MFP from each MFP.

Further, in the first exemplary embodiment, the transmission server 101 receives a supporting function list from each MFP via the web service. However, the transmission server 101 can also receive the supporting function list via a socket communication using a predetermined port.

Further, in the first exemplary embodiment, the transmission server 101 regularly acquires a supporting function list from each MFP and checks if there is a difference from the previous supporting function list. However, the present invention is not limited to the above-described method.

For example, an MFP itself can determine whether there is a change in supporting functions of the MFP at timing requested from the transmission server 101. The MFP then sends information about the support function to the transmission server 101 only if the MFP determines that there is a difference in the supporting functions. In such a case, it is not necessary for the change detection unit 301 to store the previous supporting function list and to check the difference.

Further, the MFP can notify the transmission server 101 when a change is made in the supporting function of the MFP. In such a case also, the change detection unit 301 does not need to store the previous supporting function list and to check the difference.

Further, the MFP can notify the transmission server 101 when a macro executed by the MFP ends in error due to a lack of a supporting function. In such a case also, it is not necessary for the change detection unit 301 to store the previous supporting function list and to check the difference. However, a cause of the error and the lacking supporting function are analyzed to determine the change in the supporting function. Further, since an addition of a supporting function is not detected in such a case, a unit that performs a process for adding a supporting function is also used.

Further, in the first exemplary embodiment, the change detection unit 301 detects addition and deletion of supporting functions of the MFP group including the MFP 102 and MFP 103 connected to a network. However, the change detection unit 301 can also detect other changes. Such changes can be, for example, addition and deletion of MFPs connected on the LAN 110 that can communicate with each other, and addition and deletion of a macro registered in the transmission server 101 to and from a full set of macros. Further, a change can be an editing of a macro.

In the above-described cases, a method of determining a change impact range by the change impact range determination unit 303 in the first exemplary embodiment becomes as described below.

If an MFP is added on the LAN 110, a base transmission set for the MFP becomes a full set, so that all macros registered in the full set become a change impact range.

On the other hand, if an MFP is deleted from the LAN 110, a transmission set for the MFP becomes a change impact range, so that the transmission set itself becomes deleted.

In a case where a macro is added to a full set of macros, the added macro becomes a change impact range, so that the change impact range determination unit 303 performs a determination of all transmission sets.

On the other hand, in a case where a macro is deleted from a full set of macros, the deleted macro becomes a change impact range, so that the change impact range determination unit 303 performs a determination of all transmission sets.

If a macro is edited, the edited macro becomes a change impact range, so that the change impact range determination unit 303 performs a determination of all transmission sets.

Further, in the first exemplary embodiment, the range of macros to be determined by the execution determination unit 304 is narrowed to improve efficiency. To be more specific, the execution determination unit 304 determines a transmission set for a device with respect to which the change impact range determination unit 303 has determined that there is a change in supporting functions. However, it is not necessary to narrow the range using the above-described method.

For example, all transmission sets stored in the transmission server 101 can be re-checked when there is a change in supporting functions of at least one device on a network. Further, the execution determination unit 304 can receive information about a function in which there is a change from the change detection unit 301, and set a change impact range by further narrowing down to a macro including that function. As a result, efficiency can be further improved.

Further, the present invention can aim at improving user-friendliness instead of efficiency. For example, full sets of macros and transmission sets can be divided into subsets for each user. In such a case, macros to be used by users other than a user of a device (MFP) and originally included in a transmission set become omitted from a change impact range. As a result, an administrator manages changes limited to changes in macros to be used by users as supposed by the administrator.

Further, in the first exemplary embodiment, FIG. 7 illustrates a process in which the execution determination unit 304 determines that a macro is not executable if at least one supporting function is lacking. However, the present invention is not limited to the above-described process. For example, the execution determination unit 304 can determine that the macro is executable in a case where a substitute function can replace the lacking function. An example of such a case is to replace a high-compression PDF function by a PDF function if a regular PDF function can be used instead of a high-compression PDF function.

Further, a setting can be made so that additional functions that do not affect an execution result of a macro are ignored.

Further, in the first exemplary embodiment, FIG. 7 illustrates a process in which the execution determination unit 304 compares functions that are necessary to execute a macro with all functions supported in the device. However, it is not necessary to compare the macro with all functions. For example, in a case where a supporting function is deleted, determination of whether a macro is executable can be made, for example, by only determining whether the deleted function is necessary in executing the macro.

Further, in the first exemplary embodiment, all macros registered in the transmission server 101 are registered in the macro storage unit 305 as a full set. Alternatively, only macros that are to be actually used may be registered in the transmission server 101.

Further, in the first exemplary embodiment, an MFP identifier of a transmission destination is included in a transmission set. However, the transmission destination can alternatively be stored separately from a transmission set, and the transmission destination can alternatively be changed by a scheduler. In such a case, a change in a schedule registered in the scheduler is automatically managed instead of a change in a transmission set.

Further, the present invention can be realized as a system, apparatus, method, program, or storage medium. To be more specific, the present invention can be applied to a system including a plurality of devices, or to an apparatus including a single device.

The present invention can also be achieved by directly or remotely providing a storage medium which stores software (program code) for implementing functions of the above-described exemplary embodiments to a system or an apparatus. The software (program code) stored in the storage medium can be read and executed by a computer (central processing unit (CPU) or micro-processing unit (MPU)) of the system or the apparatus. In an exemplary embodiment of the present invention, the software (program code) corresponds to the flowcharts illustrated in the figures of the above-described exemplary embodiment.

In this case, the software (program code) itself realizes the functions of the above-described exemplary embodiments using the computer. The software (program code) itself and the storage medium which stores the software (program code) constitute an embodiment of the present invention.

A computer executable program to implement the above-mentioned exemplary embodiments can take any form readable by computer, for example, object code, a program executed by an interpreter, or script data supplied to an operating system (OS).

The storage medium can be, for example, a floppy disk, a hard disk, a magneto-optical disk, a compact disc-read-only memory (CD-ROM), a CD-recordable (CD-R), a CD-rewritable (CD-RW), a magnetic tape, a nonvolatile memory card, a ROM, or a digital versatile disc (DVD, DVD-ROM, and DVD-R).

Such software (program code) can also be supplied by the system or the apparatus accessing a website on the Internet via the browser of a client computer. The software (program code) itself or a compressed file including an auto-install function can be downloaded from the website onto a hard disk. In addition, the program code can be broken up into a plurality of files, and each file can be downloaded from one or more websites. Namely, the present invention can be applied to a World Wide Web (WWW) server that allows numerous users to download the program files so that the functions or processes of the present invention can be realized on their computers.

Furthermore, such software (program code) can be encrypted and stored in a storage medium, such as a CD-ROM, to be distributed to users. A user who meets given conditions can download the key information for decrypting the program from a website through the Internet. By using the key information, the encrypted program can be executed and installed in a computer to realize the functions of the present invention.

Furthermore, the above-described exemplary embodiments can be not only realized by executing software (program code) read by a CPU. An operating system (OS) or the like working on a computer can also perform a part or the whole of processes according to instructions of the software (program code) and realize functions of the above-described exemplary embodiments.

Furthermore, software (program code) read from a storage medium can be stored in a memory equipped in a function expansion board inserted in a computer or a function expansion unit connected to a computer, and a CPU in the function expansion board or the function expansion unit can execute all or a part of the processing based on the instructions of the software (program code) to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-328714 filed Dec. 20, 2007, which is hereby incorporated by reference herein in its entirety.

What is claimed is:

1. A macro transmission server apparatus configured to store a combination of functions of a multifunction peripheral and an order of processing of the functions as a macro, to manage a plurality of such macros, and to determine a portion of the plurality of such macros to be transmitted to a corresponding multifunction peripheral of a plurality of multifunction peripherals on a network as a corresponding transmission set, the macro transmission server apparatus comprising:
   a registration unit configured to register a full set of macros in response to an operation by an administrator;
   a macro storage unit configured to store the full set of macros registered by said registration unit and the corresponding transmission set of the macros;
   a change detection unit configured to detect a change in function of the corresponding multifunction peripheral;
   a transmission set updating unit configured to change the corresponding transmission set to be transmitted to the corresponding multifunction peripheral based on the full set of macros registered by said registration unit and the corresponding transmission set of the macros according to the change detected by the change detection unit such that at least one of the macros that is executable by the corresponding multifunction peripheral is included in the corresponding transmission set; and
   a macro transmission unit configured to transmit the corresponding transmission set to the corresponding multifunction peripheral.

2. The macro transmission server apparatus according to claim 1, wherein the transmission set updating unit includes:
   a change range determination unit configured to determine the corresponding transmission set or one of the macros that requires correction according to a content of change detected by the change detection unit; and
   an execution determination unit configured to determine whether at least one of the macros can be executed by the corresponding multifunction peripheral.

3. The macro transmission server apparatus according to claim 1, wherein the change detection unit is configured to detect an increase and decrease of functions supported in the corresponding multifunction peripheral.

4. The macro transmission server apparatus according to claim 1, wherein the change detection unit is configured to detect an increase and decrease of multifunction peripherals on the network.

5. The macro transmission server apparatus according to claim 1, wherein the change detection unit is configured to detect at least one of an addition, a deletion, and a change in macros stored in the macro storage unit.

6. A method for controlling a macro transmission server apparatus configured to store a combination of functions of a multifunction peripheral and an order of processing of the functions as a macro, to manage a plurality of such macros, and to determine a portion of the plurality of such macros to be transmitted to a corresponding multifunction peripheral of a plurality of multifunction peripherals on a network as a corresponding transmission set, the method comprising:
   registering a full set of macros in response to an operation by an administrator;
   storing the full set of macros registered by the registering and the corresponding transmission set of the macros;
   detecting a change in function of the corresponding multifunction peripheral;
   changing the corresponding transmission set to be transmitted to the corresponding multifunction peripheral based on the full set of macros registered by the registering and the corresponding transmission set of the macros according to the detected change such that at least one of the macros that is executable by the corresponding multifunction peripheral is included in the corresponding transmission set; and transmitting the corresponding transmission set to the corresponding multifunction peripheral.

7. The method according to claim 6, further comprising: determining the corresponding transmission set or at least one of the macros that requires correction according to a content of the detected change; and determining whether at least one of the macros can be executed by the corresponding multifunction peripheral.

8. The method according to claim 6, further comprising detecting an increase and decrease of functions supported in the corresponding multifunction peripheral.

9. The method according to claim 6, further comprising detecting an increase and decrease of multifunction peripherals on the network.

10. The method according to claim 6, further comprising detecting at least one of an addition, a deletion, and a change in the stored macros.

11. A computer-readable storage medium storing a program for causing a computer to execute the method according to claim 6.

* * * * *